(12) United States Patent
Vogt et al.

(10) Patent No.: US 9,400,376 B2
(45) Date of Patent: Jul. 26, 2016

(54) Z-AXIS OPTICAL FOCUSING MECHANISM

(76) Inventors: William L. Vogt, Baraboo, WI (US); Michael J. Szulczewski, Middleton, WI (US)

( * ) Notice: Subject to any disclaimer, the term of this patent is extended or adjusted under 35 U.S.C. 154(b) by 864 days.

(21) Appl. No.: 13/592,946

(22) Filed: Aug. 23, 2012

(65) Prior Publication Data

US 2013/0050792 A1 Feb. 28, 2013

Related U.S. Application Data

(60) Provisional application No. 61/526,324, filed on Aug. 23, 2011.

(51) Int. Cl.
*G02B 21/24* (2006.01)
*G02B 21/00* (2006.01)

(52) U.S. Cl.
CPC ............ *G02B 21/241* (2013.01); *G02B 21/006* (2013.01)

(58) Field of Classification Search
CPC ............ G02B 5/09; G02B 5/10; G02B 21/00; G02B 21/0048
See application file for complete search history.

(56) References Cited

U.S. PATENT DOCUMENTS

2010/0202030 A1* 8/2010 Cho et al. .................. 359/205.1
2010/0268042 A1* 10/2010 Wang et al. .................. 600/322

OTHER PUBLICATIONS

Botcherby et al. (Jul. 15, 2007) "Aberration-free optical refocusing in high numerical aperture microscopy" *Optics Letters* 32(14):2007-2009.
Botcherby et al. (Feb. 21, 2012) "Aberration-free three-dimensional multiphoton imaging of neuronal activity at kHz rates" *PNAS* 109(8):2919-2924 ( http://www.pnas.org/content/1090/8/2919.full).
Kirkby et al., (Jun. 11, 2010) "A compact acousto-optic lens for 2D and 3D femtosecond based 2-photon microscopy" *Optics Express* 18(13):13721-13745.

* cited by examiner

*Primary Examiner* — Jennifer L. Doak
(74) *Attorney, Agent, or Firm* — Joseph T. Leone, Esq.; DeWitt Ross & Stevens S.C.

(57) ABSTRACT

A Z-axis focusing mechanism having a scanner and a prism whose front and rear faces are not normal to the direction of travel of a light beam prior to the light beam impinging upon the front face of the scanner. The scanner and the prism are oriented with respect to one another such that when a light beam is scanned onto the front face of the prism, a scanned beam having varying Z-axis focus points at distinct lateral locations exits the rear face of the scanner. Alternatively, the rear face of the prism may be normal to the light beam as it passes through the prism, which generates a retro-reflected, scanned light beam that exits the front of the prism.

2 Claims, 6 Drawing Sheets

Z-AXIS OPTICAL FOCUSING MECHANISM

CONTINUITY AND CROSS REFERENCE TO RELATED APPLICATIONS

This application claims the benefit of priority under 35 U.S.C. §119(e) of U.S. Provisional Application Ser. No. 61/526,324, filed on Aug. 23, 2011.

BACKGROUND

Confocal, multiphoton, and sectioning microscopes are capable of producing 3-dimensional (3D) images of a volumetric specimen. These images require that the device acquire a series of optical sections from a range of focusing depths. That is, a series of optical sections in the Z-plane. In most systems, focusing in the Z-plane is performed by mechanically moving the specimen relative to the objective lens, or vice-versa. Moving either the microscope stage or the objective lens has two major drawbacks. First, scan speeds in the Z-plane accomplished by mechanical manipulations are slow; second, the scanning movements of the stage in the Z-plane can (and do) disturb the specimen during the imaging process. Focusing deeper into the sample by manipulating the objective lens yields a slow Z-axis scan speed because the objective lens is relatively massive. Once set in motion, it takes a relatively long time period for the objective to settle prior to the next data points being acquired. Manipulating the sample itself is also problematic because the samples are often living cells, and the area of interest to be imaged is a very small portion of the cell. Moving the specimen can disturb the intra-cellular structures that are in the process of being imaged. This results in sub-par micrographic images. Thus, there remains an unmet need for an alternative focusing method that does not require mechanical movement of either the specimen or the objective lens. See, for example, Botcherby et al. (Jul. 15, 2007) "Aberration-free optical refocusing in high numerical aperture microscopy" 32(14):2007-2009, incorporated herein by reference.

SUMMARY

A first version of the device is directed to a Z-axis focusing mechanism comprising at least one scanner. The scanner is dimensioned, configured, and operationally disposed to scan a light beam through a prism. The prism has a front face proximal to the scanner and a rear face distal to the scanner. The prism is operationally situated so that the light beam exiting the scanner impinges upon the front face of the scanner. The prism itself is shaped and operationally situated in the light beam at an angle such that the front and rear face of the prism are not normal to the direction of travel of the light beam prior to the light beam impinging upon the front face of the prism. The scanner and the prism are oriented with respect to one another such that when the light beam is scanned onto the front face of the prism, a scanned beam having varying Z-axis focus points at distinct lateral locations exits the rear face of the scanner. The Z-axis focusing mechanism may optionally further comprise at least one lens and a descanner, wherein the lens is dimensioned, configured, and operationally disposed to collimate the scanned beam exiting the rear face of the prism, thereby yielding a collimated beam. The collimated beam is directed to the descanner, wherein the descanner is dimensioned and configured to bring the collimated beam to focal points at different Z-axis positions. This first version of the device may also include at least one lens operationally disposed such that the scanned beam exiting the rear face of the scanner passes through the at least one lens.

Another version of the device is a Z-axis focusing mechanism that includes a scanner as described earlier. Likewise, the prism has a front face proximal to the scanner and a rear face distal to the scanner such that the light beam exiting the scanner impinges upon the front face of the scanner. Also, the prism is disposed in the light beam at an angle such that the front and rear face of the prism are not normal to the direction of travel of the light beam prior to the light beam impinging upon the front face of the prism. But in this second version of the device, the rear face of the prism is oriented with respect to the front face of the prism such that light passing through the prism impacts the rear face of the prism at normal and is retro-reflected onto itself. The scanner and the prism are oriented with respect to one another such that when the light beam is scanned through the front face of the prism, a retro-reflected scanned beam having varying Z-axis focus points exits the front face of the prism. Here, the device may further comprise at least one lens operationally disposed between the scanner and the front face of the prism.

Another version of the Z-axis focusing mechanism comprises a scanner as defined previously and an array comprising a plurality of lenses defining at least one plane disposed in the light beam at an angle such that the plane defined by the array of lenses is not normal to the direction of travel of the light beam. In this version of the device, the scanner and the array are oriented with respect to one another such that when the light beam is scanned through the array, a scanned beam having varying Z-axis focus points is generated. This can be accomplished using offset lens all having the same focal length, or using lenses in the array having more than one focal length.

In yet another version of the device, the Z-axis focusing mechanism comprises a scanner and an array comprising a plurality of lenses and a corresponding plurality of lenses defining at least one radial path disposed in the light beam. Here, the scanner and the array are oriented with respect to one another such that when the light beam is scanned through the array, the scanned light beam passes through the plurality of lenses, is retro-reflected from the plurality of mirrors to generate a retro-reflected, scanned light beam. The retro-reflected, scanned light beam passes back through the corresponding plurality of lenses, whereby a plurality of discrete light beams having varying Z-axis focus points is generated.

The phrase "operationally disposed" when describing the relative arrangement between two named elements defines how the two element structurally and functionally interact and does not exclude intervening elements between the two named elements. Thus, for example, "a scanner 'operationally disposed' to scan a light beam through a prism" does not exclude the presence of additional unnamed elements, such as lenses, mirrors, and the like, that the light beam may pass through or reflect from during its passage from the scanner to the prism.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, 5, 6, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made.

The methods of the present invention can comprise, consist of, or consist essentially of the essential elements and limitations of the method described herein, as well as any additional or optional ingredients, components, or limitations described herein or otherwise useful in optics in general and microscopy in particular.

BRIEF DESCRIPTION OF THE FIGURES

In each of FIGS. 1-5, the Z-axis is in the horizontal direction.

FIG. 6 is a schematic diagram of the Z-axis focusing mechanism shown in FIG. 2 incorporated into a multiphoton microscope.

DETAILED DESCRIPTION OF THE INVENTION

Figure 1:
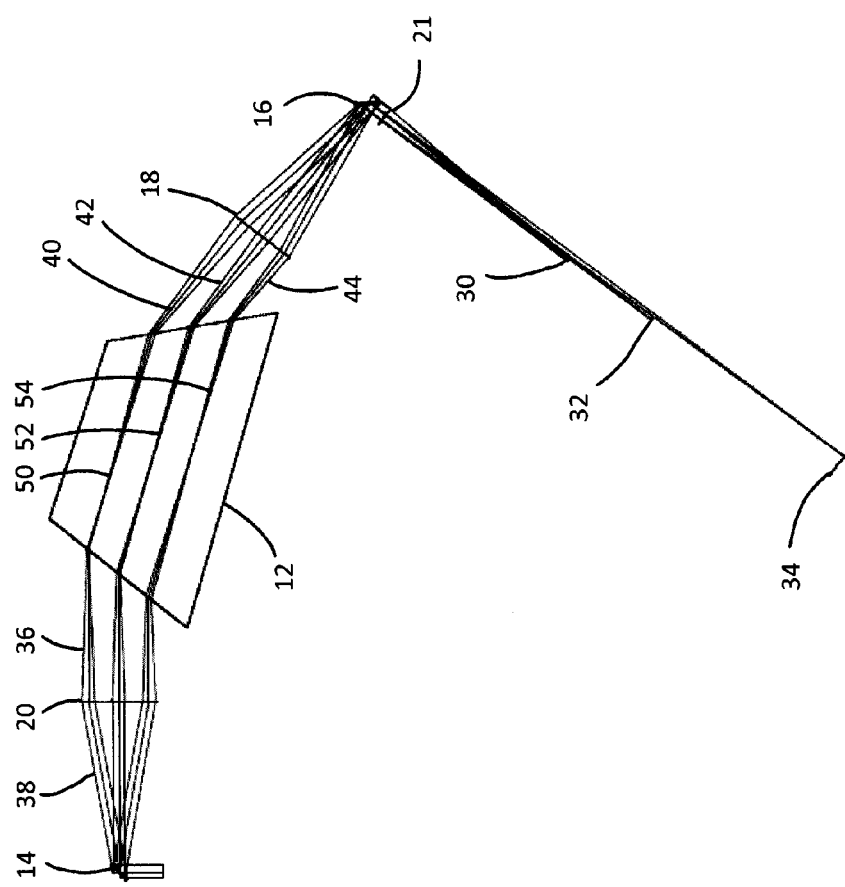
FIG. 1 is a schematic diagram of a first version of the Z-focusing mechanism.

At the heart of the device is the realization that arranging a prism or other optical deflector within a beam path in which the lateral displacement can vary results in a varying optical distance of refraction or retro-reflection in confocal microscopy and the like. The necessary result of this varied optical distance is a correspondingly varied focal plane on the return beam. Thus, by judiciously placing an appropriately shaped prism at a pre-selected angle (or range of angles) within the beam path of a confocal microscope, the incoming beam can be scanned through the prism at various lateral displacements, thereby yielding a different Z-axis focal plane depending on the displacement of the ray as it enters/exits the prism. Regarding the individual components illustrated in the drawing figures, all of the lenses, mirrors, scanners, prisms, galvanometric controllers, detectors, etc., are of conventional design. Their assembly into the Z-axis focus mechanism described and claimed herein is, however, novel and inventive.

Thus, a first version of the device is depicted in FIG. 1. A light source (not shown) directs a beam of light at scanner 14. In the discussion that follows, "scanner" (or "descanner" as the context dictates) is used for sake of brevity and clarity only. There are many different means to deflect a light path in a controlled fashion, such as galvanometer-controlled mirrors, acousto-optical deflectors, polygonal scanners, diffraction gratings, microelectromechanical systems (MEMS), reflective and transmissive spatial light modulators, and the like. All of these devices, as well as those developed in the future for scanning a beam of light are encompassed by the word "scanner" or "descanner" and can be used in place of the galvanometer-controlled mirrors explicitly depicted in the drawing figures. The scanner 14 generates a scanned beam of light 38 which can be focused via lens 20 to yield a focused, scanned beam 36 which is then directed through prism 12. The incoming beams of light 36 are thus refracted through the prism to yield separate light beams 50, 52, and 54, all of which exit the prism 12 at distinct lateral locations, thus yielding corresponding beams 40, 42, and 44. These beams are then collimated via lens 18 and pass onto an optional descanner 16 to yield corresponding beams 30, 32, and 34. These beams, 30, 32, and 34 pass through lens 21 (seen just below the descanner 16 in FIG. 1) which brings beams 30, 32, and 34 to focal points at different depths (i.e., at different Z-axis points) within the sample. By judiciously programming scanners/descanners 14 and 16, and adjusting the angle of the prism 12 accordingly, the Z-axis dimension can be scanned quickly without moving the objective lens or the specimen itself. In short, the Z-plane can be scanned purely by optical means, in the absence of any mechanical movement of the specimen or the objective lens.

Figure 2:
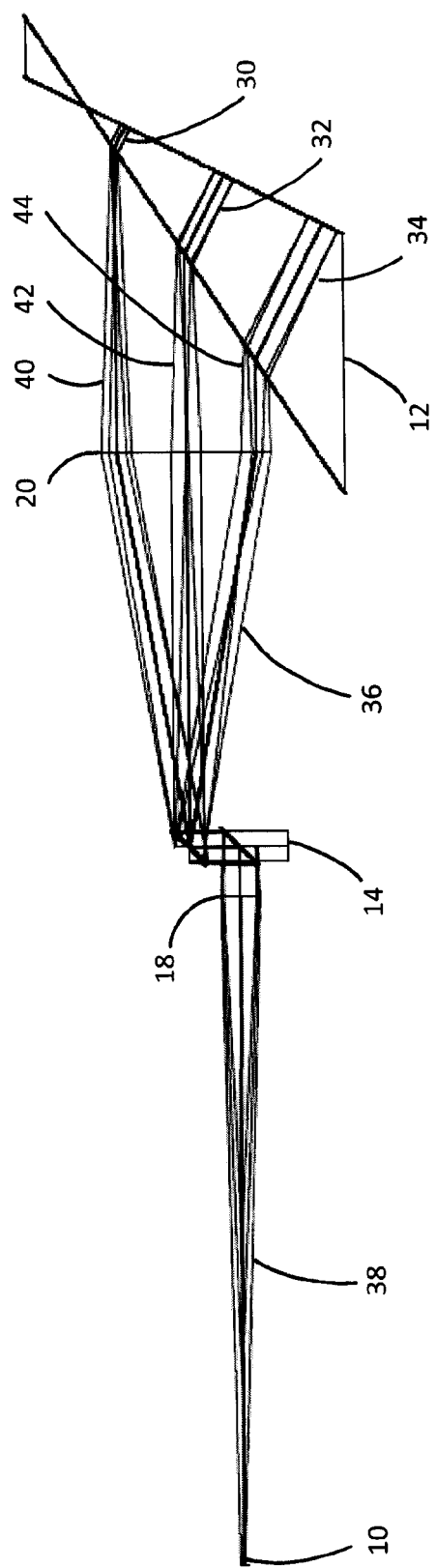
FIG. 2 is a schematic diagram of a second version of the z-axis focusing mechanism.

An alternate version of the Z-axis focusing mechanism is shown in FIG. 2. Here, a prism 12 is arranged at such an angle that the back reflective face of the prism is at an angle normal to the internal ray, and is thus reflected back upon itself. This is shown in beams 30, 32, and 34. Because of the angle of the prism 12, the return beams 40, 42, and 44 reach focus at different points in the Z-axis. (Again, recall that in the figures the horizontal direction is the Z-axis.) Thus as shown in FIG. 2 a light source is scanned through scanner and directed through lens 20 to prism 12. The resulting rays 30, 32, and 34 strike the back wall of the prism at normal and are back-reflected through the prism and exit as beams 40, 42, and 44, each of which have a different focal point in the Z-axis dues to the angle of prism 12. Thus, beams 40, 42, and 44 can be used (via an optical relay; see FIG. 6), to scan a sample in the Z-axis (for example, at points 38 and 10) via lens 18. This is possible because the point of focus in the Z-plane is different for each of beams 40, 42, and 44 due to the angle of tilt of the prism 12.

Figure 3:
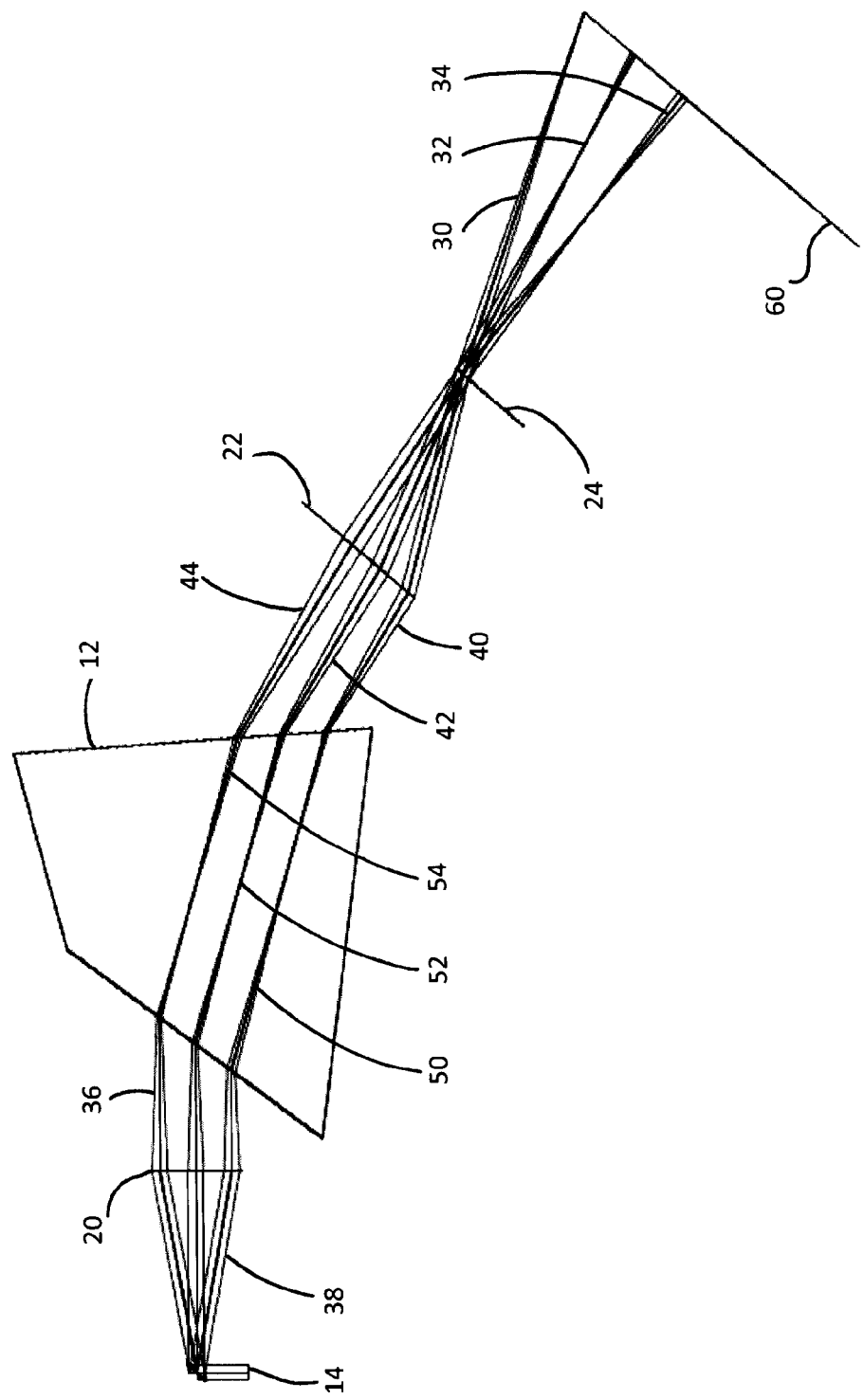
FIG. 3 is a third version of the Z-axis focusing mechanism.

FIG. 3 depicts another version of the device which is similar to the version shown in FIG. 1, but omits the descanner 16 which is depicted in FIG. 1. Thus, as shown in FIG. 3, a scanner 14 sends a beam light 38 through the lens 20 to yield incoming scanned beam 36 which impinges on prism 12. The prism generates refracted beams 50, 52, and 54, which exit prism 12 at different lateral displacements to yield corresponding rays 40, 42, and 44. These beams are passed through lenses 22 and 24 to yield corresponding rays 30, 32, and 34, each of which has a different focal point in the Z-axis. (Again, the Z-axis is in the horizontal plain in FIGS. 1-5.) In this fashion, the Z-axis can be scanned quickly by raster scanning the scanner 14.

Figure 4:
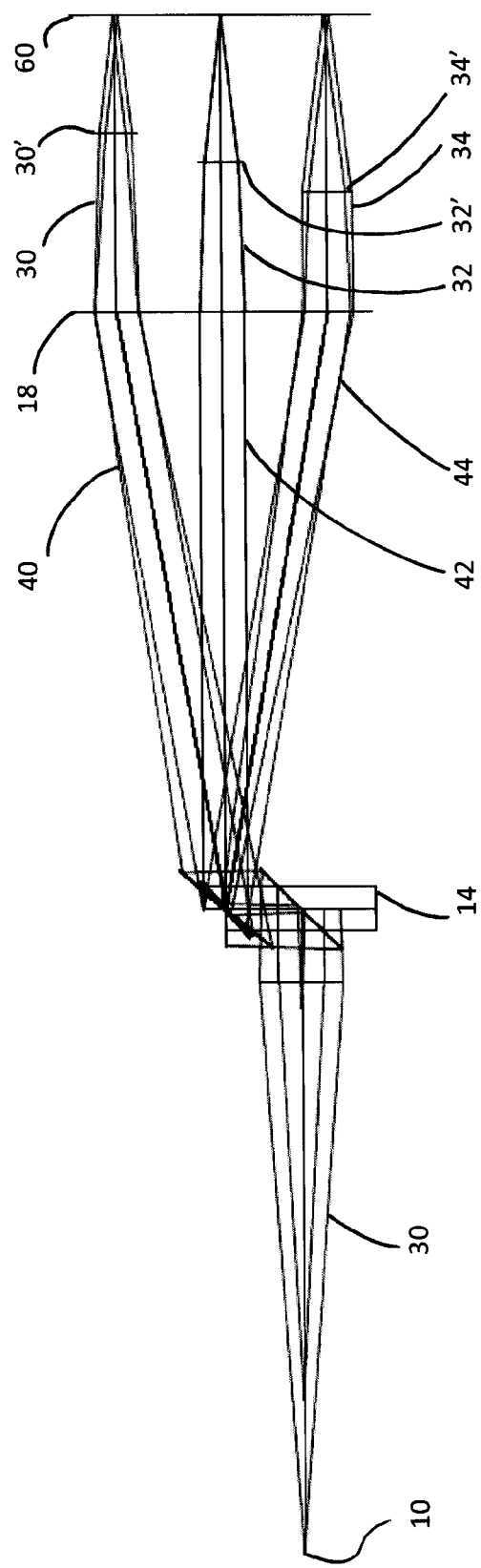
FIG. 4 is a fourth version of the z-axis focusing mechanism.

FIG. 4 depicts another version of the Z-axis focusing mechanism which, rather than using a prism, uses a series of micro-lenses 30', 32', and 34' to yield differing focal points within the Z-axis. As shown in FIG. 4, a light source (not shown) is used to generate a light beam 30 which is scanned through scanner 14, to yield the scanned beams 40, 42, and 44. Lens 18 is employed to direct the scanned beams to a 2D array of micro-lenses having differing focal lengths or an array of micro-lenses having the same focal length, but offset from one another in the Z-axis. As shown in FIG. 4, beams 40, 42, and 44 exit lens 18 as corresponding beams 30, 32, and 34, and are directed to corresponding offset micro-lenses 30', 32', and 34'. Because the lenses 30', 32', and 34' are offset, or have different focal lengths, or a combination of the two, the beams 30, 32, and 34 retro-reflected from mirror 60 have different focal points 10 in the Z-axis. In this fashion, the Z-axis can be scanned optically by controlling the scanner 14 to sweep the retro-reflected beams 30, 32, and 34 through the sample.

Figure 5:
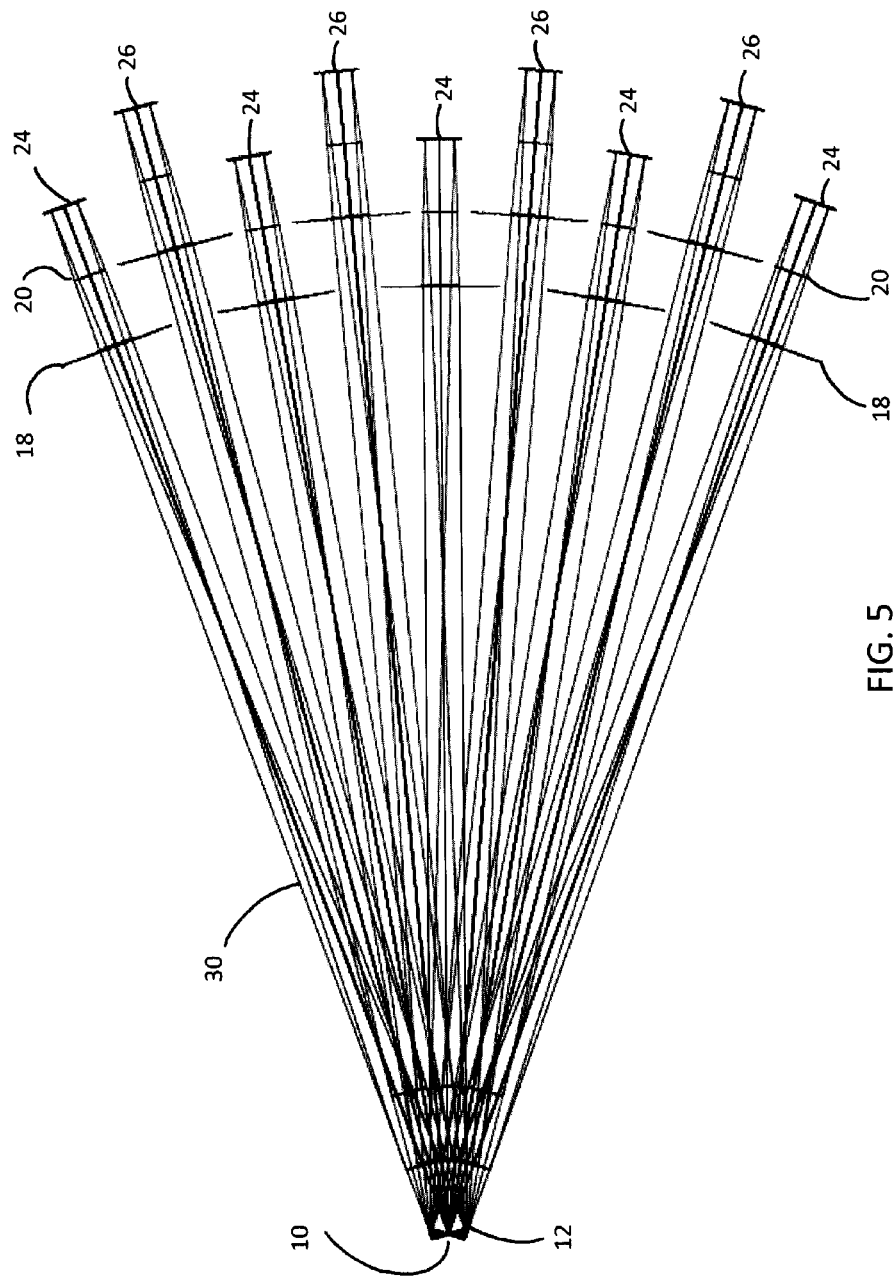
FIG. 5 is a fifth version of the Z-axis focusing mechanism.

FIG. 5 depicts yet another version of the Z-axis focusing mechanism. Here, a series of mirrors 24 and 26 (analogous to mirror 60 in FIG. 4), and ancillary lenses 18 and 20, are arranged in a radial pattern. The mirrors 24 and 26 are positioned to retro-reflect back onto the scanned incoming beam 30. Using a scanner (not shown) the beam 30 can be scanned across the array of mirrors 24 and 26 to yield multiple Z-axis focus points 10 quickly. The multiple Z-axis focal points are then relayed to an objective lens (no shown) to scan the sample in the Z-axis.

Figure 6:
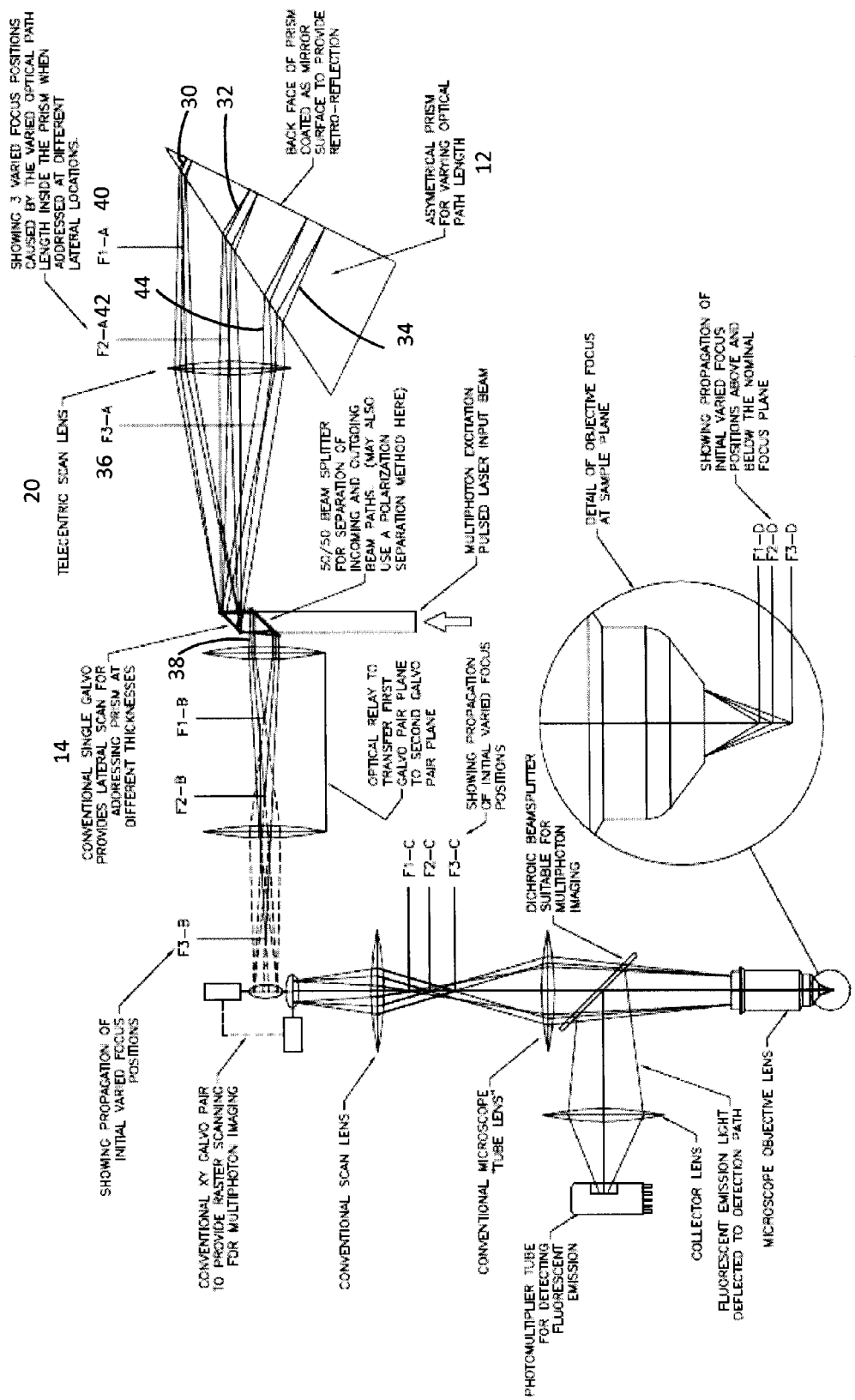
In FIG. 6, the Z-axis is in the vertical direction.

FIG. 6 depicts the Z-axis scanner shown in FIG. 2, integrated into a multiphoton microscope. Thus, in the same fashion as in FIG. 2, a prism 12 is arranged at such an angle that the back reflective face of the prism is at an angle normal to the internal ray, and the internal ray is thus reflected back upon itself. This is shown in beams 30, 32, and 34. Because of the angle of the prism 12, the return beams 40, 42, and 44 reach focus at different points in the Z-axis. Thus as shown in FIG. 6 a light source (shown by the hollow arrow at the center of the figure, entering scanner 14) is scanned through scanner 14 and directed through lens 20 to prism 12. The resulting rays 30, 32, and 34 strike the back wall of the prism at normal and are back-reflected through the prism and exit as beams 40, 42, and 44, each of which have a different focal point in the Z-axis dues to the angle of prism 12. Beams 40, 42, and 44 are then directed via an optical relay in a microscope to image a sample.

As shown in FIG. 6, the scanner 14 provides lateral scanning to address the prism 12 at different thicknesses. The optical relay at F1-B and F2-B and transfers the first galvanometer pair plane from scanner 14 to a second galvanometer pair plane as shown by the XY galvanometer pair depicted in the upper left corner of FIG. 6. The scanned beam is passed through a convention scan lens to propagate the initial varied Z-axis focus positions as shown by F1-C, F2-C and F3-C in FIG. 6. The remainder of FIG. 6, in the bottom left corner of the figure, is a conventional multiphoton microscope that includes a conventional tube lens, dichroic beamsplitter, objective lens, collector lens, and photon detector for detecting light emitted from the sample. The varied Z-axis focus positions are shown in the magnified view of the objective lens shown at the lower center of FIG. 6. The varied focus positions in the Z-axis are labeled F1-D, F2-D, and F3-D.

What is claimed is:

1. A Z-axis focusing mechanism comprising:
    a scanner dimensioned, configured, and operationally disposed to scan a light beam through;
    a prism having a front face proximal to the scanner and a rear face distal to the scanner such that the light beam exiting the scanner impinges upon the front face of the prism, and wherein the prism is disposed in the light beam at an angle such that the front and rear face of the prism are not normal to the direction of travel of the light beam prior to the light beam impinging upon the front face of the prism;
    wherein the scanner and the prism are oriented with respect to one another such that when the light beam is scanned onto the front face of the prism, a scanned beam having varying Z-axis focus points at distinct lateral locations exits the rear face of the prism; and
    further comprising a lens and a descanner, wherein the lens is dimensioned, configured, and operationally disposed to collimate the scanned beam exiting the rear face of the prism, thereby yielding a collimated beam, and directing the collimated beam to the descanner, wherein the descanner is dimensioned and configured to bring the collimated beam to focal points at different Z-axis positions.

2. The Z-axis focusing mechanism of claim 1, wherein the scanner is selected from the group consisting of galvanometer-controlled mirrors, acousto-optical deflectors, polygonal scanners, diffraction gratings, microelectromechanical systems (MEMS), reflective spatial light modulators, transmissive spatial light modulators, and combinations thereof.

* * * * *